United States Patent [19] [11] 4,072,227
Nomura et al. [45] Feb. 7, 1978

[54] PIN TYPE TRANSFER APPARATUS FOR APERTURED-WORKPIECES

[75] Inventors: Motoi Nomura, Takarazuka; Yasuhiro Shirai, Shizuoka; Yoshiaki Yoshinaga, Iwata; Kouji Yamaizumi, Fukuroi, all of Japan

[73] Assignee: NTN Toyo Bearing Co. Ltd., Japan

[21] Appl. No.: 653,153

[22] Filed: Jan. 28, 1976

[30] Foreign Application Priority Data

| Jan. 28, 1975 | Japan | 50-12096 |
| Nov. 13, 1975 | Japan | 50-137049 |
| Nov. 14, 1975 | Japan | 137605 |
| Nov. 15, 1975 | Japan | 50-137414 |
| Nov. 18, 1975 | Japan | 50-139103 |
| Nov. 26, 1975 | Japan | 50-142117 |

[51] Int. Cl.$^2$ .......................... B65G 43/00
[52] U.S. Cl. .................... 198/370; 198/464; 198/678
[58] Field of Search .......... 198/38, 177 R, 20 R, 198/24, 470, 464, 489, 490, 678, 651, 370; 214/11 R

[56] References Cited

U.S. PATENT DOCUMENTS

| 1,266,262 | 5/1918 | Hetzel | 214/11 R |
| 1,757,732 | 5/1930 | Pade | 198/20 R X |
| 2,128,057 | 8/1938 | Schindler | 198/20 R X |

FOREIGN PATENT DOCUMENTS

| 528,496 | 5/1954 | Belgium | 198/177 R |

Primary Examiner—Evon C. Blunk
Assistant Examiner—Douglas D. Watts
Attorney, Agent, or Firm—Hall & Houghton

[57] ABSTRACT

A transfer apparatus designed so that workpiece transfer pins are fixed at predetermined intervals to a chain circulating along a frame. The pins horizontally project through a lateral surface of the frame and are also circulated in conjunction with the circulation of the chain so that apertured workpieces may be caught by the pins projecting through the frame and be conveyed along with the travel of the pins. Along the path of travel of the pins and at the necessary locations, there are disposed workpiece inlet, outlet, bypass and delivery devices. Other merits and details of the construction will be made clear.

3 Claims, 22 Drawing Figures

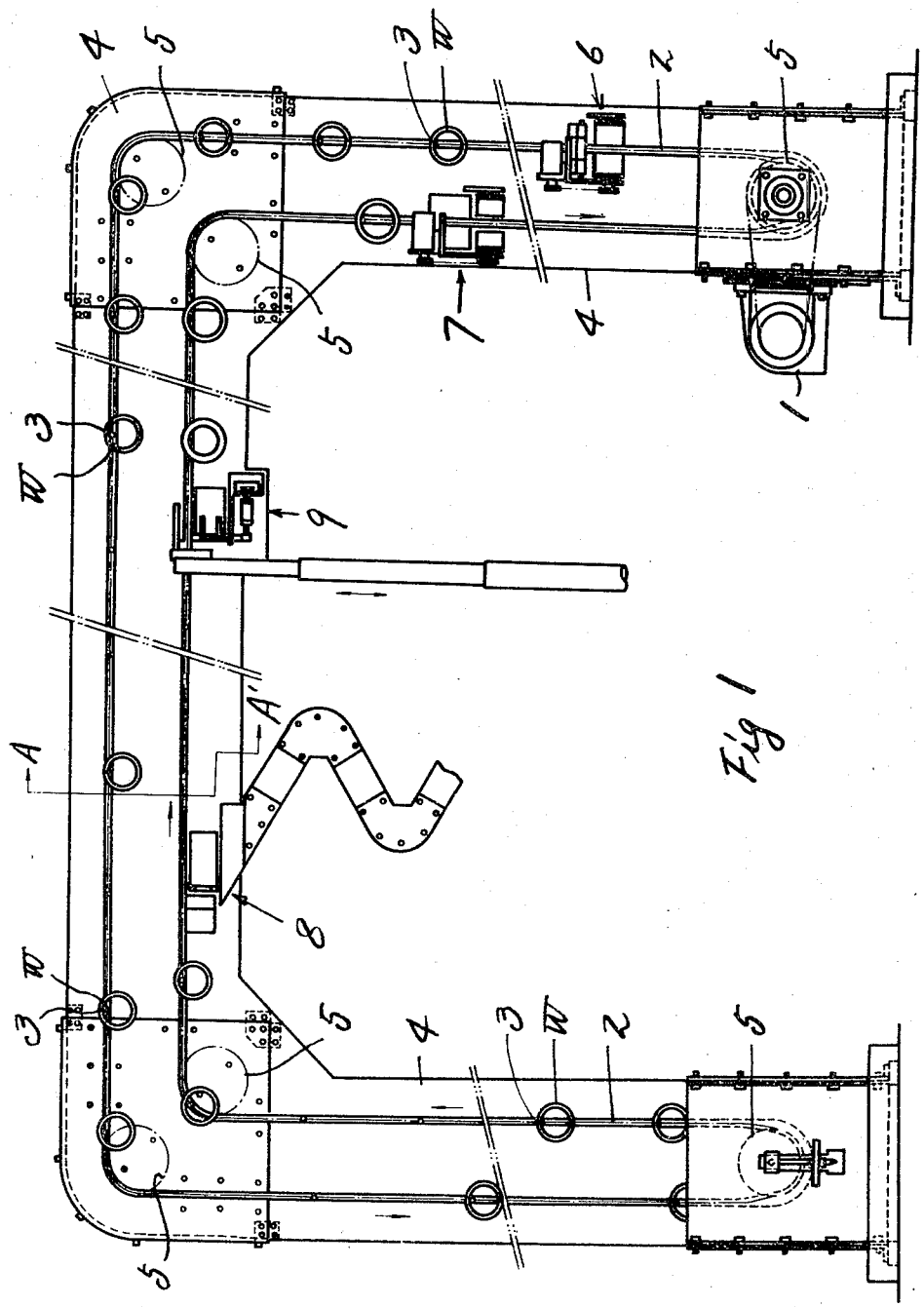

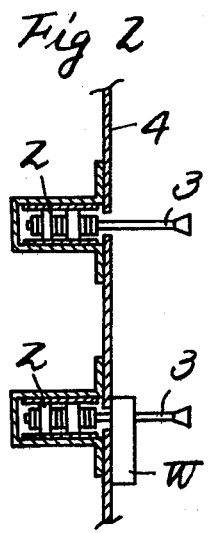
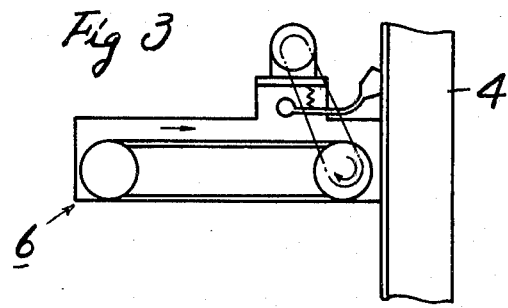
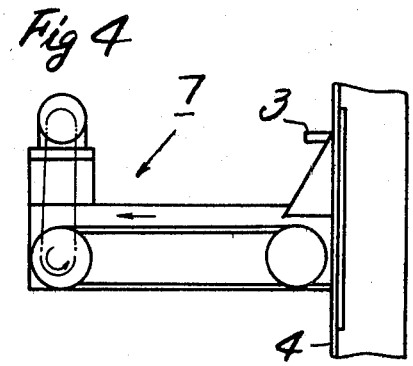
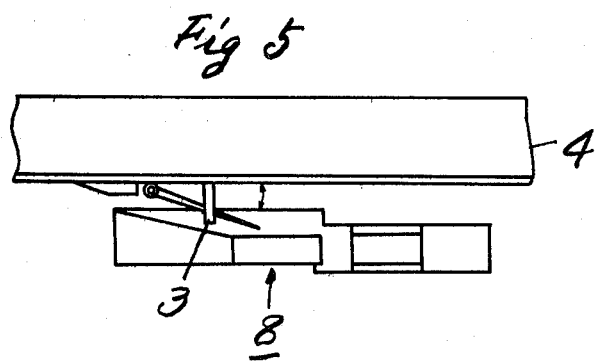
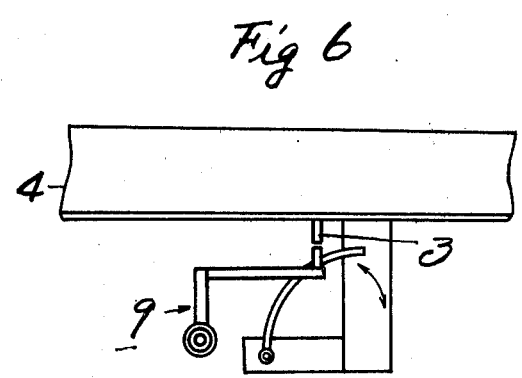

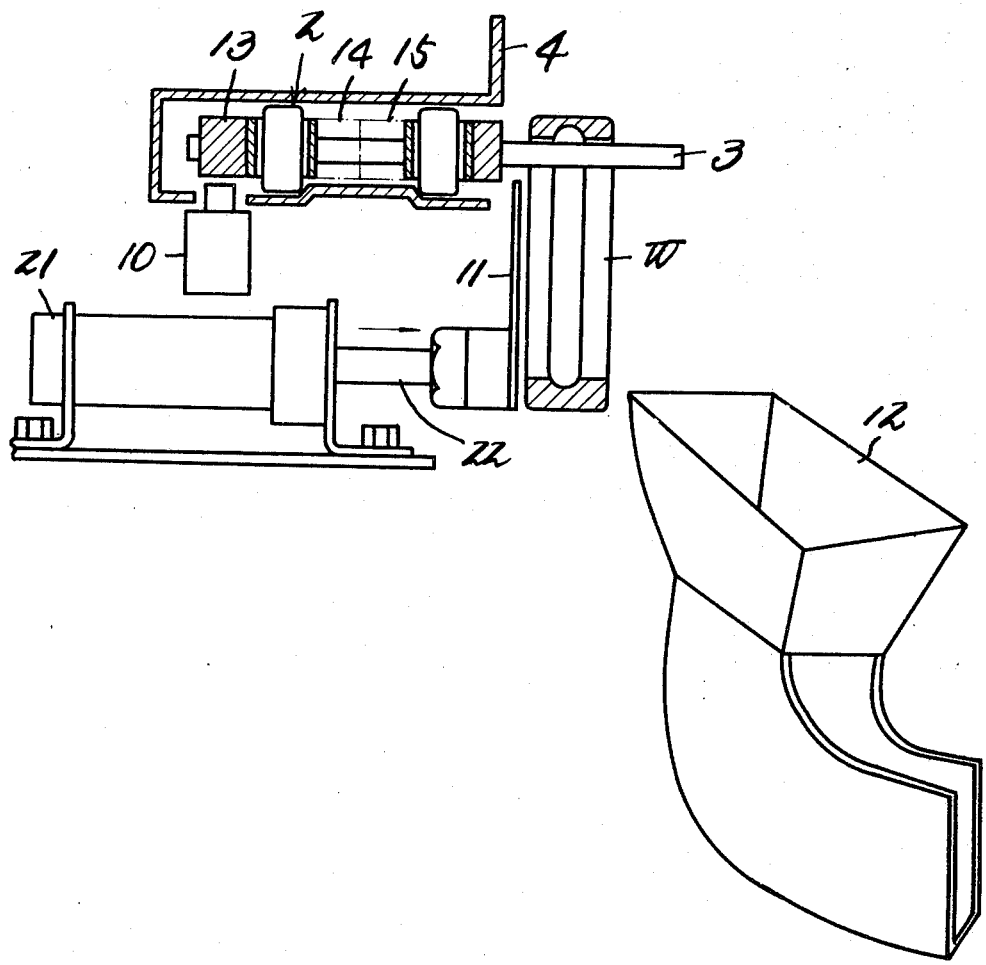

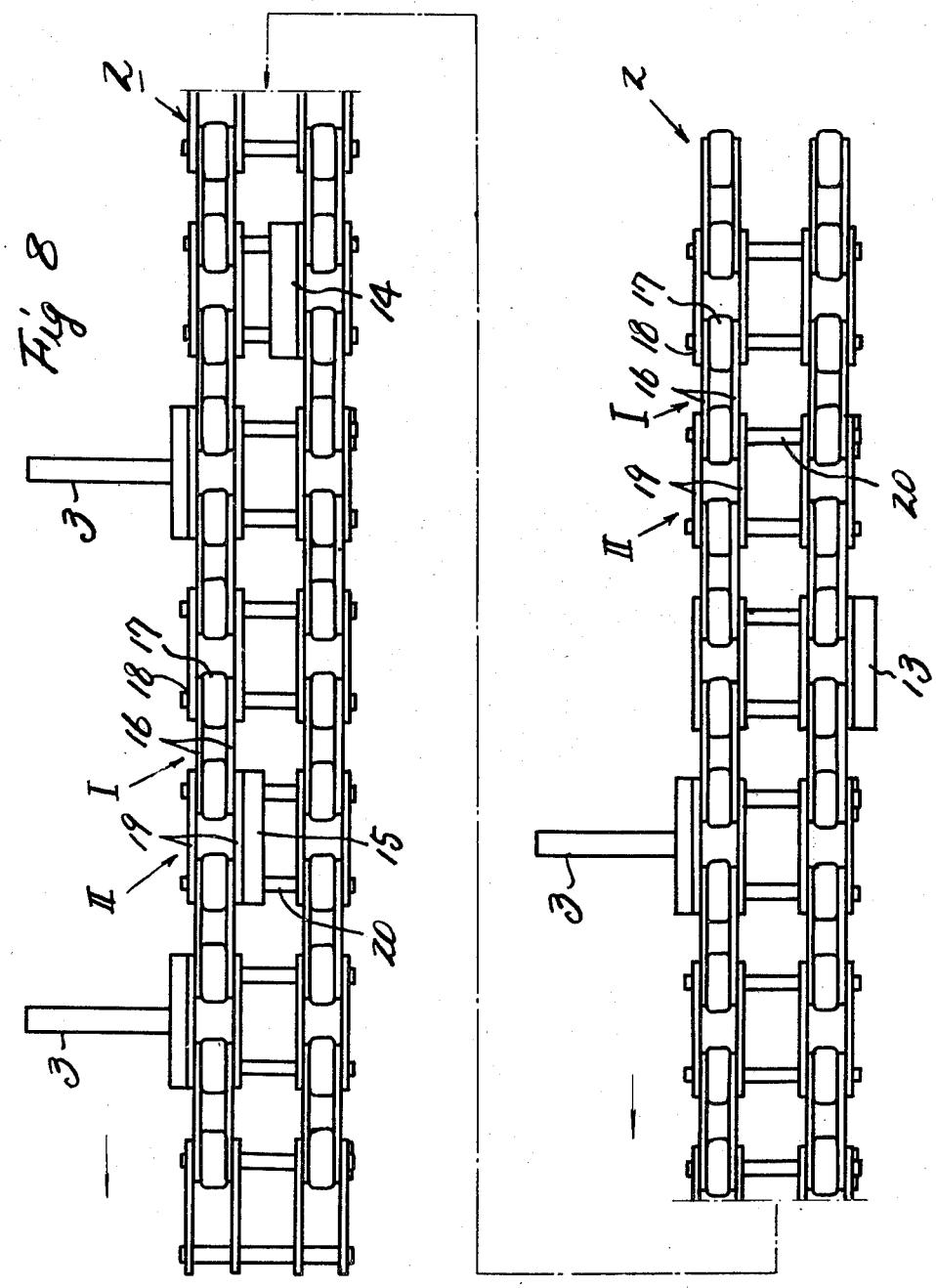

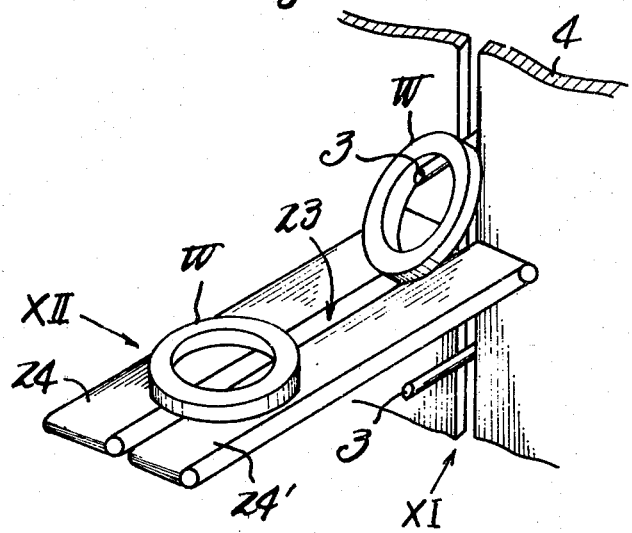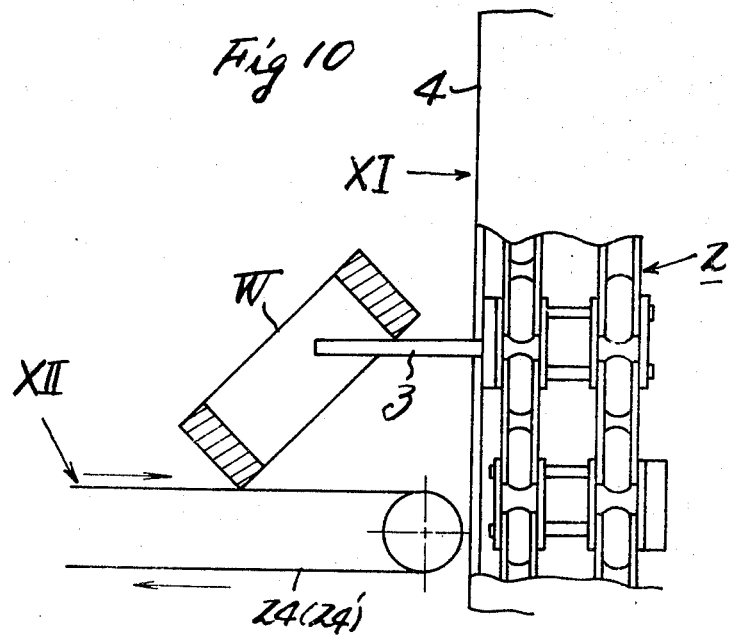

PIN TYPE TRANSFER APPARATUS FOR APERTURED-WORKPIECES

BACKGROUND OF THE INVENTION

1. Field of the Invention

The present invention relates to a pin type transfer apparatus for apertured-workpieces, comprising a transfer chain adapted to circulate in an endless form inside a conveyor frame along a lateral surface thereof, and workpiece transfer pins fixed to said transfer chain, said transfer chain and pins constituting a main line. More particularly, a transfer chain is provided which travels in an endless circulating form inside a conveyor frame along a lateral plane thereof and pins are fixed to said chain at predetermined equal or unequal intervals and horizontally project beyond the conveyor frame so that workpieces can be freely received by and removed from the revolving workpiece transfer pins. Inlet means and outlet means according to the present invention are provided with the ability to identify the type of workpieces in connection with the workpiece transfer pins, so that the function as a transfer apparatus is enhanced, thus providing for the storage of workpieces between work stations in addition to the mere interconnection of work stations.

2. Description of the Prior Art

Several forms of pin type transfer apparatus comprising a chain adapted to circulate in an endless form and pins attached to said chain and adapted to catch workpieces have already been known. These conventional forms, however, transfer workpieces simply from below to above or in one direction alone. In recent years, manufacturers and other persons in the industry have come to give serious attention to the increasing needs for complete automation of production processes, lavor saving and effective use of land and buildings. In the field of the pin type transfer apparatus, researches have been conducted and drawbacks of the conventional forms have been detected. The conventional pin type transfer apparatuses, particularly those having a vertical transfer portion and a horizontal transfer portion have been found to have the following problematic points.

First of all, in the conventional pin type transfer apparatus, particularly when it has a horizontal transfer portion, transfer by the return side of the chain in the horizontal transfer portion is impossible. Second, when the direction of transfer of workpieces is turned downwardly from the horizontal transfer portion, the workpiece becomes unstable and a fall-preventive plate or the like is required. Further, it is necessary to adjust the clearance between such fall-preventive plate and the frame to the width dimension of the workpiece. Third, because of the restriction placed on the direction in which the pins are attached, it is difficult to turn the direction of transfer of workpieces since workpieces interfere with the sprockets. Fourth, the components in the workpiece reception and delivery sections must be grooved and it is necessary to adjust the width of the grooves in accordance with changes in the width dimension of workpieces.

OBJECTS OF THE INVENTION

A first object of the present invention is to provide a pin type transfer apparatus for apertured-workpieces arranged so that all the transfer pins simultaneously take part in reception, transfer or delivery of workpieces.

A second object of the invention is to provide a pin type transfer apparatus for apertured-workpieces arranged so that all the transfer pins simultaneously take part in reception, transfer or delivery of workpieces and that such single apparatus makes it possible to establish communication among a plurality of work stations and wherein a number of outlets are provided for a single inlet.

A third object of the invention is to provide a pin type transfer apparatus for apertured-workpieces arranged so that all the transfer pins simultaneously take part in reception, transfer or delivery of workpieces and wherein a single outlet is provided for a number of inlets.

A fourth object of the invention is to provide a pin type transfer apparatus wherein all the transfer pins circulating in an endless form in the same plane are used as workpiece transfer pins, enabling one or more types of workpieces to be transferred at the same time.

A further object of the invention is to provide a pin type transfer apparatus for simultaneously transferring several types of workpieces with the above-described first to fourth basic cencepts incorporated therein, including means for identifying the type of workpieces.

A further object of the invention is to provide a pin type transfer apparatus for apertured-workpieces with the above-described first to fourth basic concepts incorporated therein, including inlet and outlet means such as conveyors or chutes for moving workpieces from a horizontal to a vertical direction or from a vertical to a horizontal direction.

A further object of the invention is to provide a workpiece hand-over device for use with a pin type transfer apparatus with the above-described first to fourth basic concepts incorporated therein, including inlet means for handing over workpieces with respect to upward transfer pins moving from a horizontal to a vertical direction. In addition, this inlet means may be provided with an ability for selection.

A further object of the invention is to provide a bypass device with the above-described first to fourth basic concepts incorporated therein, wherein while workpieces are conveyed, the pins retaining such workpieces are detected for discharging the workpieces into outside the machine. In addition, the bypassing device is provided with an ability for selection.

A further object of the invention is to provide, in a pin type transfer apparatus having transfer pins moving over a lateral surface of a horizontal frame with the above-described first to fourth basic concepts incorporated therein, an operative connecting device, i.e., a collecting device for transfer of workpieces between vertical transfer pins on the workpiece charging side and horizontal transfer pins on the transfer chain side, in order to feed apertured-workpieces from a lower work position into an upper horizontal trasfer pin position. In addition, the collecting device is provided with an ability for selection.

PRECONDITIONS FOR EMBODYING THE INVENTION

There are some indispensable preconditions for the realization of the present invention. These preconditions are enumerated below.

1. The transfer chain must travel in a circulating manner along a lateral plane of and inside the conveyor frame.

2. The transfer chain must have a large width for stabilized travel.

3. The workpiece transfer pins fixed to the transfer chain must have their front ends projecting outwardly through the conveyor frame and be in a horizontal state.

4. The transfer pins must be varied in their attaching pitch for each group or must have identifier dogs attached thereto, in order to enable several types of workpieces to be simultaneously transferred.

5. Inlet and outlet means having an ability for selection must be connected to the apparatus.

6. Workpieces must have a prostrated attitude when outside the pin type transfer apparatus and a standing attitude(catching state)whenever inside the apparatus.

BRIEF DESCRIPTION OF THE DRAWINGS

FIG. 1 is a front view showing the whole of an embodiment of the present invention;

FIG. 2 is a section of a frame taken along the line A—A in FIG. 1;

FIG. 3 is a schematic view of an inlet unit;

FIG. 4 is a schematic view of an outlet unit;

FIG. 5 is a schematic view of a bypass unit;

FIG. 6 is a schematic view of a collecting unit;

FIG. 7 is a schematic view of means for identifying the type of workpieces;

FIG. 8 is a plan view showing the relationship among dogs, a transfer chain and transfer pins;

FIG. 9 is a perspective view of a first embodiment of the inlet means;

FIG. 10 is a side view of the first embodiment;

PREFERRED EMBODIMENTS OF THE INVENTION

Figure 11:
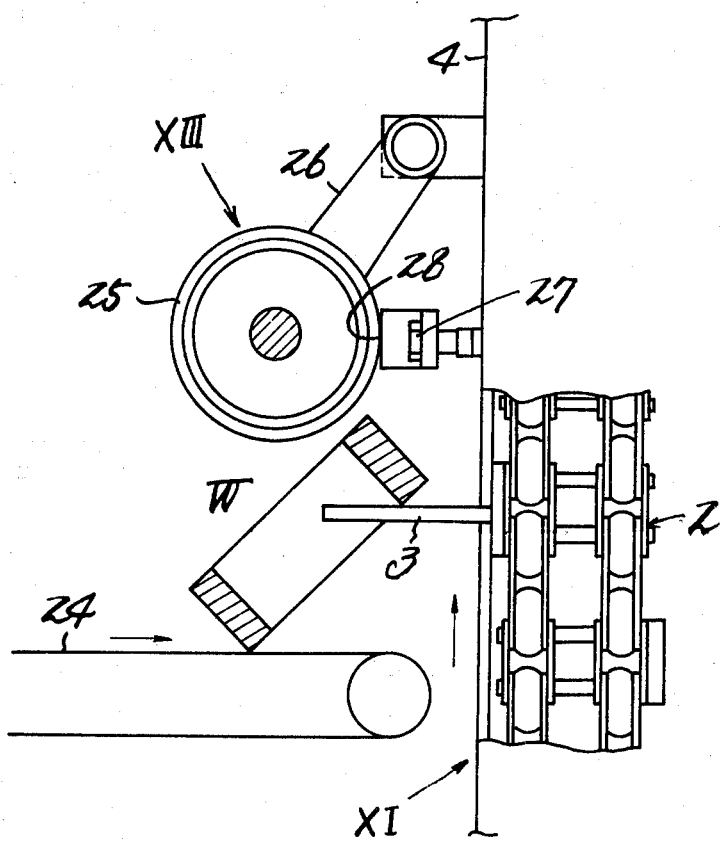
FIG. 11 is a side view of a second embodiment in the form of a roller type using roller type insertion means.

The arrangement of the present invention will now be described with reference to an embodiment shown in FIGS. 1 through 6.

Referring now to the drawings and with particular reference to FIG. 1, an illustrative embodiment of a transfer apparatus made in accordance with the present invention is shown. The transfer apparatus includes a conveyor frame 4 that is shown in a generally U-shaped configuration but which may be of any desired shape. A plurality of sprockets 5 are mounted in spaced relationship along the entire length of the conveyor frame 4 and adapted to receive conveyor chain 2 therearound. The transfer chain 2 is formed of a roller chain arranged in two rows, as shown in FIG. 2, and inserted in the conveyor frame 4 and circulating in an endless form around the plurality of spaced sprockets 5 within the confines of the from 4. A drive motor 1 is mounted on one end of the conveyor frame 4 and is operatively connected to a sprocket 5 mounted on the conveyor frame 4 to drive the transfer chain 2 in endless relationship. A plurality of transfer pins 3 are attached to one lateral surface of the transfer chain 2 at spaced intervals along the entire length thereof with the pins 3 projecting outwardly therefrom.

An inlet unit 6 is associated with the frame 4 adjacent one end thereof in operative relationship with one side of the transfer chain and receives the apertured workpieces W which, as shown in FIG. 3, are conveyed thereto by a belt conveyor and are transferred to the transfer pins 3 carried on one side of the endless transfer chain 2. An outlet unit 7 is associated with the conveyor frame 4 adjacent the inlet unit 6 and in operative association with the other side of the endless transfer chain 2 and functions to receive the apertured workpieces W removed from the transfer pins 3 mounted on the other side of the transfer chain 2. The removed workpieces W are, as shown in FIG. 4, carried therefrom by a belt conveyor to another place. A by-pass unit 8 is associated with the conveyor frame 4 intermediate the ends thereof and in operative relationship with the side of the transfer chain 2 that leads to the outlet unit 7. The by-pass unit 8, as shown in FIG. 5, functions to receive predetermined workpieces W which are removed from a transfer pin at this point. A collection unit 9 is mounted on the conveyor frame 4 forward of the by-pass unit 8 and in operative relationship to the same side of the endless transfer chain 2 as the by-pass unit 8. The collecting unit 9, as shown in FIG. 6, takes workpieces W which are transferred thereto and hands them over to empty transfer pin 3. The details of the inlet unit 6, the outlet unit 7, the by-pass unit 8 and the collecting unit 9 will be described in greater detail hereinafter.

The apparatus according to the present invention operates in the following manner.

The sprockets 5 are driven by the drive motor 1. The sprockets 5 mesh with the transfer chain 2 and cooperate with other several sprockets 5 to circulate the transfer chain vertically and horizontally. The transfer pins 3, which are directed in the direction of the shafts of the sprockets 5, are attached to a lateral surface of the transfer chain 2 at predetermined intervals. In addition, the pitch at which the transfer pins 3 are attached is not necessarily an equal distance. The frame 4 is box-shaped in cross section and the transfer chain 2 circulates inside the same. One lateral surface of the frame 4 facing toward the shafts of the sprockets 5 is provided with a slit or an opening through which the straight portions of the transfer pins attached to the transfer chain 2 project. In addition, in some cases, the front end portions of the transfer pins 3 will be thickened in a taper form for the prevention of fall of workpieces W. Workpieces W conveyed by the inlet unit 6 are picked up by inserting the transfer pins 3 into the central apertures thereof and transferred by the transfer chain 2 to the destination where they are then taken out by suitable means. That is, workpieces W are transferred to the place of the outlet unit 7 and taken out, or desired workpieces W are transferred to another destination by the bypass device 8. Further, by feeding workpieces W of other sizes onto transfer pins 3 by the collecting device 9, it is possible to transfer two or more types of workpieces at the same time.

As described above, the transfer pins 3 according to the present invention take part in reception, transfer or delivery of workpieces W and enable transfer of workpieces W also on the return side of the transfer chain 2. Further, since the meshing between the transfer chain 2 and sprockets 5 does not interfere with the transfer of workpieces W at any bends, it is possible to transfer workpieces freely from a horizontal to a vertical direction and vice versa. Since the attitude of workpieces being transferred is always constant, stabilized transfer is possible even at the bends of the transfer chain 2. With the apparatus according to the present invention serving as the main line, the use of the bypass unit 8 collecting unit 9 attached to the frame 4 enables workpieces to be taken in and out at any places as required, so that communication among a plurality of work stations is possible. Further, two or more types of workpieces can be transferred at the same time and changes in the size of workpieces can be accommodated without the need to alter the arrangement of the apparatus. Since no sliding or rolling movement of workpieces is involved in transfer thereof, there is no unstableness due to such rolling or sliding and hence there is no transfer trouble whatsoever. Further, there is no possibility of workpieces striking the apparatus, and hence there is no problem of pitting or noise.

A typical example of the method of identifying the type of workpieces will now be described with reference to FIGS. 7 and 8.

In FIG. 7, 10 designates a detector; 11, a member for removing workpieces W from a transfer pin 3; and 12 designates a chute whereby workpieces removed from transfer pins 3 are carried to a predetermined place. Designated at 13 is a detector dog provided at a portion of the transfer chain 2 in operative association with the transfer pins 3, and the position at which the dog is attached will be shifted to the position of a detector dog 14 or 15 shown in phantom lines in accordance with the type of workpieces W.

The transfer chain 2, as shown in FIG. 8, consists of two rows of chains comprising links I including link plates 16, 16 between which bushings 18 having rollers 17 fitted thereover are disposed, and links II interconnecting the links I with two pin link plates 19, 19 interposed therebetween, said links I and II are alternately connected together by pins 20. The transfer chain is caused to circulate in an endless form inside the frame 4. The dogs 13, 14 and 15 are each associated with one of the transfer pins 3 fixed to and projecting from one lateral surface of the transfer chain 2 and are attached to the transfer chain 2 with their positions varied axially of the transfer pins 3. Therefore, the dog 13 has a path of travel different from those of the dogs 14, 15 and the dog 14 has a path of travel different from those of the dogs 13, 15. The detector 10 is attached by notching one lateral surface of the frame 4 and disposed in one of the paths of travel of the dogs 13, 14 and 15. The releasing member 11 is attached to the front end of the piston rod 22 of a cylinder 21 and serves to remove workpieces W from the transfer pins 3 when the piston rod 22 is extended.

The operation of the various parts will now be described.

First of all, different types of workpieces W are transferred by being placed on the transfer pins 3 associated with the dogs 13, 14, 15. When the dog 13 is detected by the associated detector 10, the latter extends the piston rod 22 and the release member 11 pushes the workpiece W over the transfer pin 3 down into the chute 12 standing in readiness therebelow. The dogs 14, 15 operate in the same manner as the dog 13. Since the dogs 13, 14, 15 do not travel in the same path, there is no possibility of the detector 10 for the dog 13 detecting the other dogs 14, 15. Therefore, the predetermined dog can be detected at the position of the detector 13, and the identification of workpieces W can be easily effected.

While the above description has been given with workpieces W initially placed on the transfer pins 3, it is possible to place several types of workpieces on empty pins 3 by using dogs and detectors in the same manner.

As described above, the transfer chain 2 is provided with a dog mechanism comprising several detector dogs each paired with one of the transfer pins 3 and facing in the direction in which the transfer pins 3 project, with their positions of attachment shifted with respect to each other. The detection of the shift of the position of the dogs enables the identification of the type of dogs and hence the type of workpieces retained by transfer pins 3 paired with said dogs. Thus, by carrying workpieces of predetermined type numbers on the transfer pins 3, it is possible to transfer several types of workpieces at the same time. Therefore, by using the single transfer line, several types of workpieces can be transferred and the reception and delivery of workpieces can be automatically effected at predetermined positions. If the distance between the constituent chains or the number of rows of them is increased, a larger number of dogs can be provided and hence a corresponding number of types of workpieces can be transferred at the same time. Further, since the identification of the type of workpieces is not by their shapes or sizes, there is no need to change the detectors or other arrangements even if the type numbers of workpieces to be transferred by the transfer pins are to be changed.

The inlet unit used in the present invention will now be described with reference to FIGS. 9 through 11.

The system according to FIGS. 9 and 10 is concerned with the movement of workpieces from a horizontal to a vertical direction or from a vertical to a horizontal direction and is constituted by a vertical pin type transfer device XI and a horizontal conveyor device XII. The vertical pin type transfer device XI comprises a frame 4, a transfer chain 2 adapted to circulate inside the frame, and transfer pins 3 carried upwardly and downwardly by the transfer chain 2. The conveyor device XII comprises two conveyor belts 24, 24' opposed to the transfer chain 2 and horizontally disposed close to each other to define a clearance therebetween so as to allow the transfer pins attached to the transfer chain to pass therethrough, and means (not shown) for driving the belts 24, 24' in the forward and reverse directions.

In this embodiment, a workpiece W conveyed on the conveyor belts 24, 24' to their front ends is caught by a transfer pin 3 on the upward transfer chain 2 traveling inside the orthogonal vertical frame 4 and is carried to an upper position. Further, a workpiece W retained by a downward transfer pin 3 on the downward transfer chain 2 traveling inside the vertical frame 4 may be placed on the conveyor belts 24, 24' as the workpiece W is withdrawn from the downwardly moving transfer pin 3, and it may then be carried to a horizontal predetermined position.

In addition, the conveyor device XII may be replaced by a somewhat inclined chute (not shown) or a horizontal plate-like chute (not shown) provided with pusher means (not shown).

The device shown in FIG. 11 includes a workpiece insertion means XIII attached to the frame 4. In this case, the device is intended for the transfer of workpieces W upwardly from a horizontal direction. Thus, the workpiece insertion means XIII is fixed on the above-described frame 4 astride the transfer chain 2 and comprises two rollers 25, 25' having a central clearance therebetween through which the upward transfer pins 3 pass, swing arms 26, 26' and stops 27, 27'. The swing arms 26, 26' are pivotally connected at their roots to the frame 4 and provided at their front ends with rollers 25, 25'. The stops 27, 27' are fixed on the frame 4 below the swing arms 26, 26', the front end surfaces 28, 28' thereof normally contacting the outer peripheral surfaces of the rollers 25, 25'.

In this embodiment, the rollers 25, 25' serve to urge a workpiece W against the root of an upward transfer pin 3 as said workpiece is conveyed by conveyor belts 24, 24' and raised by the transfer pin 3. In this case, the rollers 25, 25' are arranged so that they can be rotated and that they can be slightly moved up and down by the swing arms 26, 26'. However, it is not always necessary to rotate the rollers 25, 25'. It is only necessary for them to have a smooth surface highly resistant to wear. Further, it is not always necessary to use a cylindrical roller, and instead an inclined plate or a semilunar plate may be used.

As described above in the two embodiments, the inlet means is constituted by transfer means such as conveyor belts or chute having a central clearance allowing the passage of transfer pins 3 therethrough, a transfer chain circulating along a frame orthogonal to said transfer means, and transfer pins fixed to said transfer chain. The positional relationship between the components is so versatile relative to the shape and size of workpieces to be transferred that there is no need to make adjustments in connection with some change of type numbers. Further, workpieces can be extremely easily and securely moved vertically from a horizontal direction or horizontally from a vertical direction. Moreover, the device is simple in construction.

Figure 12:
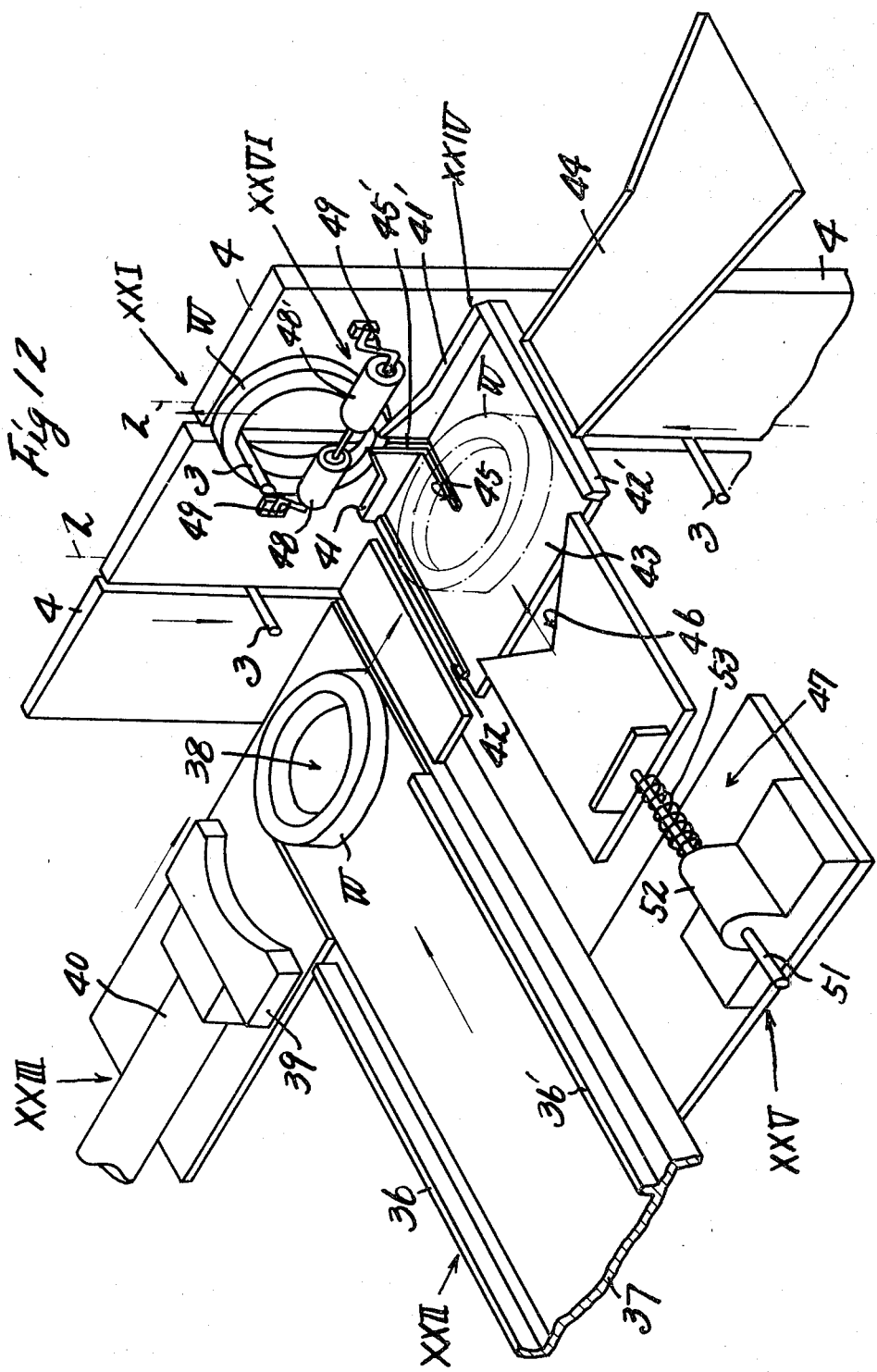
FIG. 12 is a perspective view showing the entire arrangement of another embodiment of the inlet means.
Figure 13:
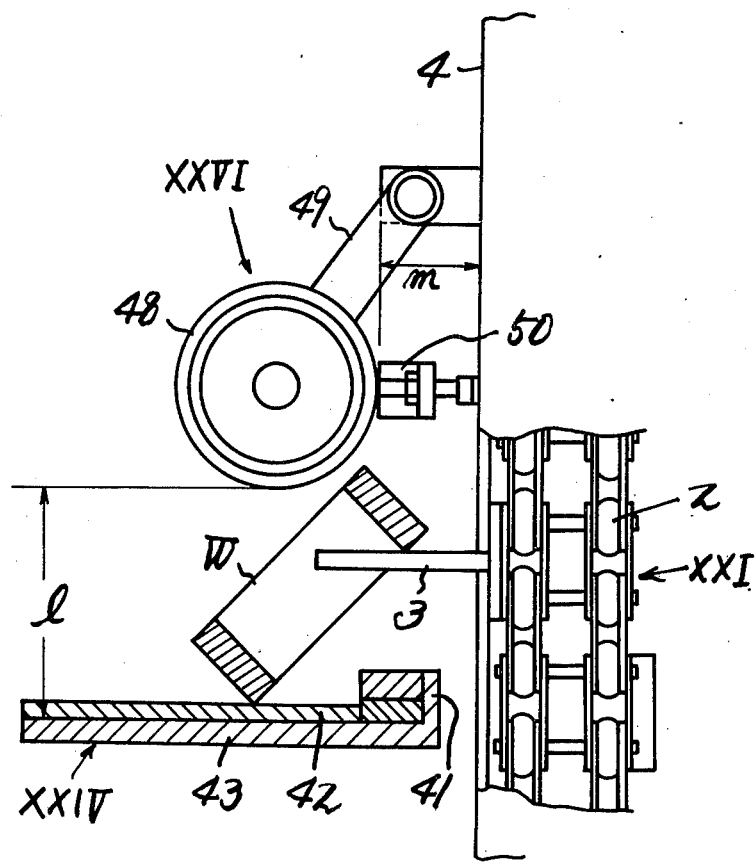
FIG. 13 is a view looking laterally at a hand-over section shown in FIG. 12.

FIGS. 12 and 13 show another embodiment of an inlet device, comprising a vertical pin type transfer device XXI, a chute XXII, a pusher XXIII, hand-over dish means XXIV, and insertion means XXVI. The pin type transfer device XXI comprises a vertical frame 4 defining a path of travel for transfer pins 3, a transfer chain 2 adapted to move vertically inside the frame 4, and transfer pins 3 attached to said transfer chain 2 for vertical movement therewith. The chute XXII comprises a flat conveyor or plate 37 provided with upright guides 36, 36 on both sides, there being provided a loading position 38 at the terminal end thereof. The pusher XXIII comprises a V-notched pusher plate 39 and a piston 40 and it is positioned in the same plane as that of the loading position 38 of the chute XXII and set so as to forwardly and horizontally push a workpiece W located at the loading position 38 on the chute XXII. The hand-over dish means comprises a dish 43 provided with upright flanges or walls 41, 41', 42, 42', and an arm 44 supporting the dish 43 and adapted to be revolved by a cam or other means (not shown). The front portion of the dish 43 intimately engages upward transfer pins 3 on the pin type transfer device XXI and has a notched groove 45 allowing upward transfer pins 3 to pass therethrough upwardly from below. In addition, defined between the front flanges or walls 41 and 41' on the dish 43 is a clearance corresponding to the clearance in the notched groove 45 of the dish 43. The adjusting means XXV comprises a V-notched adjusting plate 46 and a mechanism 47 for resiliently forwardly pushing said adjusting plate 46 and it is disposed somewhat above the level of the workpiece hand-over dish 43, the arrangement being such that when a workpiece W at the loading position 38 on the chute XXII is pushed onto the dish 43, the arm 44 supporting the dish 43 is rearwardly revolved by the action of cam means (not shown) and the workpiece W on the dish 43 is forwardly pushed by the adjusting plate 46 until it assumes its normal position. The insertion means XXVI comprises two rotatable rollers 48, 48', swing arms 49, 49' supporting these rollers 48, 48' for vertical movement, and a stop 50 and it is mounted on the frame 4 and astride the transfer chain 2. That is, the essential arrangement of this device is as follows. The front end of the chute XXII and the dish 43 of the hand-over means XXIV extend close to the attachment region of transfer pins 3 approximately perpendicularly to the vertical transfer section of the pin type transfer device XXI. The chute XXII and dish 43 are provided with notched grooves 45, 45' through which transfer pins pass. Above the dish 43, there are rollers 48, 48' supported by swing arms 49, 49' and the swing arms 49, 49' are pivotally connected to the frame 4. As shown in FIG. 13, the distance l from the upper surface of the dish 43 to the lower side of the outer diameter of the rollers 48, 48' is about $\frac{1}{2} - \frac{2}{3}$ of the outer diameter of a workpiece W to be processed. The rollers 48, 48' can be vertically revolved around the pivot at which the swing arms 49, 49' are attached to the frame 4. A stop 50 is provided intermediate between the swing arms 49, 49' and the dish 43 and the controlled clearance between the frame 4 and the rollers 48, 48' is about $\frac{1}{2}$ - 1 of the width dimension of workpieces W. Further, the rollers 48, 48' are supported by bearings (not shown) so as to be rotatable. The dish 43 is provided with flanges or walls 41, 41', 42' so that a workpiece W to be transferred can be positioned substantially at the middle. The adjusting plate 46 for determining the normal position W' for a workpiece W when the latter is to be picked up from the dish 43 by a transfer pin 3 is supported by a support shaft 51 which is guided by a guide 52. The adjusting plate 46 is forwardly urged by a spring 53.

In operation, when a workpiece W is positioned on the loading position 38 on the chute XXII, the piston 40 of the pusher XXIII is extended so that the workpiece W is pushed by the pusher plate 39 fixed to the front end of the piston 40 until it is placed on the dish 43 of the hand-over means XXIV. However, it does not necessarily follow that the workpiece W assumes the normal position W' on the dish 43. Then, the arm 44 supporting the dish 43 is rearwardly revolved by a cam or other means (not shown). Disposed rearwardly of the dish 43 is the adjusting plate 46, and the workpiece W abuts against the V-shaped notch in said adjusting plate so that the workpiece is relatively forwardly pushed into contact with the V-shaped flanges or walls 41, 41' and placed at the normal position W' on the dish 43. If the workpiece has a large outer diameter, the adjusting plate 46 is retracted, but when the dish 43 is forwardly moved again, the adjusting plate is pushed back to its original position by the spring 53. The dish 43 is then forwardly moved by the arm 44 under the action of the cam or other means (not shown) until it assumes a position opposed to the transfer chain 2 in the frame 4. At this time, the notched groove 45 in the dish 43 assumes a position opposed to an upward transfer pin 3 being conveyed by the transfer chain 2. Since the upward transfer pin 3 being conveyed by the transfer chain 2 can pass through the notched groove 45 in the dish 43, the workpiece W on the dish 43 is caught and upwardly transferred by the transfer pin 3 which has passed through the notched groove 45 in the dish 43. At a position above the dish 43 and astride the transfer chain 2, there exist the rollers 48, 48' attached to the frame 4 through the swing arms 49, 49' and cooperating with the frame to define a clearance therebetween. Therefore, when the workpiece W caught and removed from the dish 43 by the upward transfer pin 3 passes between the rollers 48, 48' and the frame 4, it is pushed in fully to the root of the upward transfer pin and upwardly conveyed. The dish 43 is brought back to its original position by the arm 44 under the action of the cam or other means (not shown).

As has been described so far, the inlet means consists essentially of hand-over means including a dish for receiving a workpiece W pushed out from the loading position 38 by the pusher XXIII, provided with a notched groove 45 at the front central region thereof and supported for swinging back and forth, an adjusting member disposed rearwardly of the hand-over dish whereby a workpiece W on said hand-over dish is positioned at the normal position, and insertion means for workpieces W attached to the frame so as to be disposed above said hand-over dish and astride the transfer chain 2 and transfer pins 3, the arrangement being such that a workpiece W on said hand-over dish is caught by a transfer pin and thereby conveyed to a predetermined place. Therefore, workpieces being fed in with their end faces down can be extremely easily handed over to transfer pins upwardly moving along the vertical frame. Further, the positional relationship of the various parts is very versatile relative to changes in the shape and size of workpieces and some change in the shape or size does not necessitate adjustments.

Figure 14:
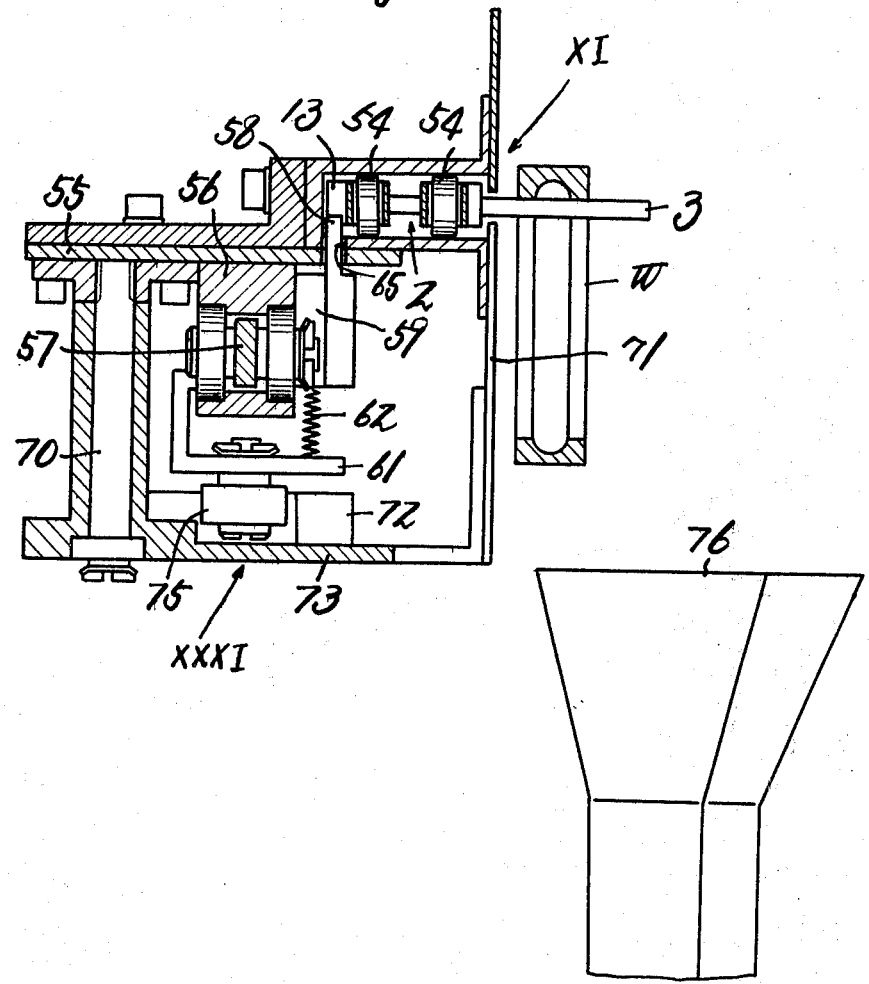
FIG. 14 is a section of a pypass device used in the present invention.
Figure 15:
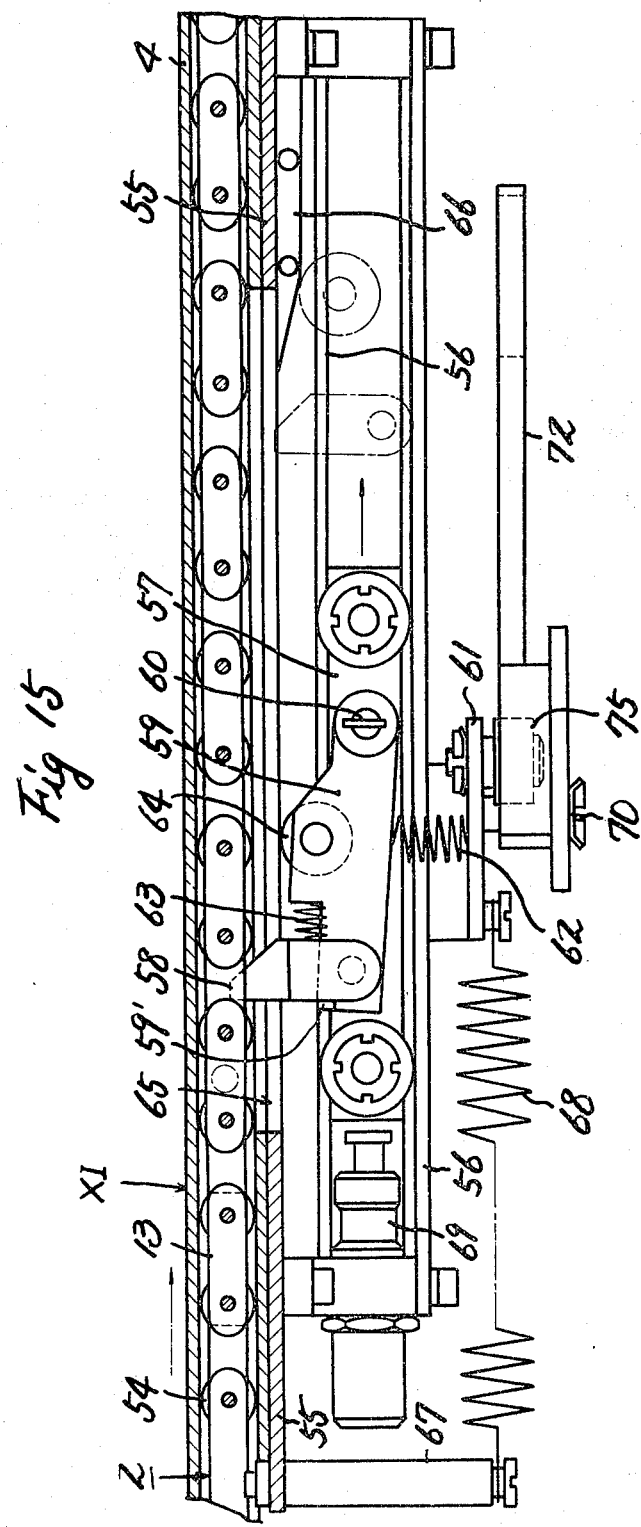
FIG. 15 is a side view of the bypass device.
Figure 16:
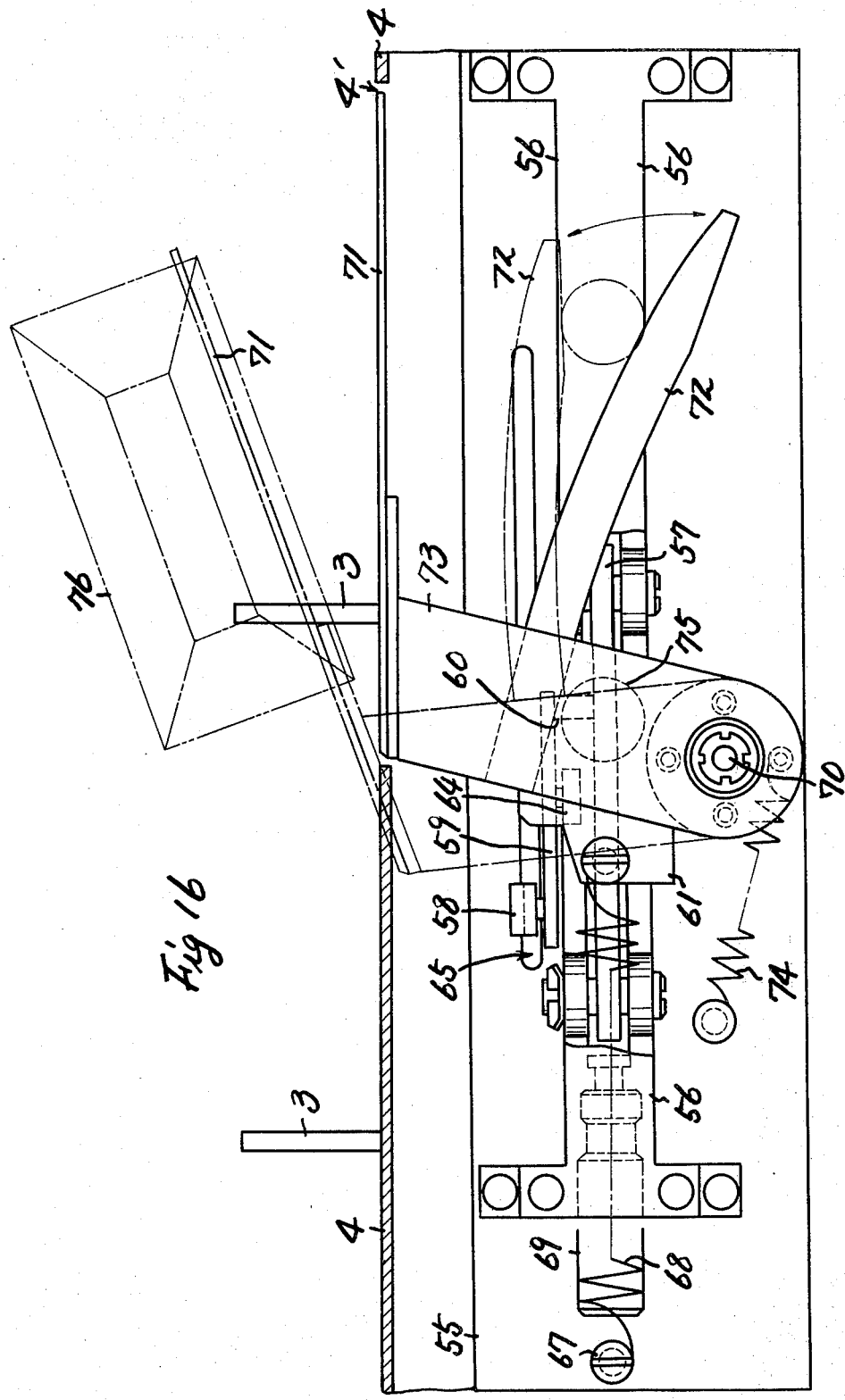
FIG. 16 is a bottom view of the bypass device.

A bypass device according to the bypass unit used in the present invention will now be described with reference to FIGS. 14 through 16.

In these FIGS., the bypass device comprises a transfer device XI for transferring workpieces, and a discharge device XXXI for discharging workpieces from the transfer device XI. The transfer device XI comprises a transfer chain 2 having roller chains 54 arranged in two rows adapted to be circulated inside a frame 4, transfer pins 3 for retaining workpieces attached to every several links of said transfer chain 2 so as to project from one side of said transfer chain, and a detector dog 13 associated with a transfer chain 3. The dog 13 is variable in its position axially of the transfer chain 2. The discharge device XXXI is attached through a base 55 to the lateral surface of the frame 4 where the transfer pins 3 do not project, as shown in FIG. 14. Fixed on the base 55 is a slide guide 56 which is parallel to the transfer chain and in which a slide 57 is axially moved. The lateral surface of the slide 57 has a catcher arm 59 pivotally connected thereto by a pin 60 and provided at its front end with a rotatable catcher 58 for detecting the dog 13 attached to the transfer chain 2. The catcher arm 59 is constantly upwardly urged by a push-up spring interposed between the catcher arm and an arm 61 fixed to the slide 57, while the catcher 58 is constantly urged against a stop 59' on the catcher arm 59 by a buffer spring 63 interposed between the catcher and the catcher arm. The catcher arm 59 has a catcher roller 64 attached to the central region thereof and contacting the base 55 to facilitate the movement of the catcher arm 59. The front end of the catcher 58 projects into the path of travel of the transfer chain 2 through an elongated notch 65 formed in the bottom of the frame 4 and in the base 55, and waits for a dog 13 to come.

The catcher roller 64 is longitudinally movable together with the catcher arm 59 into contact with a wedge-shaped cam 66 attached to the inner surface of the base 55 to depress the catcher arm 59 against the force of the push-up spring 62 to thereby release the catcher 58 from the dog 13. The slide 57 and catcher arm 59 are pulled back by a return spring 68 interposed between a fixed shaft 67 on the base 55 and an arm 61 fixed to the slide 57. Disposed rearwardly of the slide guide 56 is a cushion unit 69 for absorbing a shock when the slide 57 returns to its original position. The base 55 is provided with a revolving shaft 70, which is provided with a swing member 73 having attached thereto an ejector 71 and a swing arm 72 for dropping workpieces W from the transfer pins 3. A revolving return spring 74 is interposed between the swing member 73 and the lower surface of the base 55 for positioning the ejector plate 71 in a notch 4' in the frame 4 to maintain it in parallel relationship with the frame 4. An arm 61 fixed to the slide 57 is provided with a cam follower 75 which contacts the swing arm 72 at its side adjacent the position where the swing arm 72 and the swing member 73 are connected together. The swing arm 72 is attached in such an attitude that it extends obliquely with respect to the dirction of travel of the transfer chain 2 so as to interfere with the forward movement of the cam follower 75 which is moved along with the transfer chain 2. The cam follower 75, by being moved along with the slide 57 in the direction of the transfer chain 2, urges the swing arm 72 against the force of the revolving spring 74 to swing the swing member 73 for actuating the ejector plate.

The operations of the various parts will now be described. Workpieces W are retained by the transfer pins 3 and being transferred by the transfer chain 2. When a dog 13 attached to the transfer chain 2 strikes the catcher 58 projecting into the path of travel of the transfer chain, it pushed and advances the catcher 58. The slide 57 retaining the catcher 58 through the catcher arm 59 is then moved at the same speed as that of the transfer chain 2. Since the cam follower 75 connected to the slide 57 urges the swing arm 72 as the slide 57 is moved, the swing arm 72 is gradually revolved as shown in phantom lines in FIG. 16 and hence the swing member 70 joined to the swing arm 72 revolves around the axis of the revolving shaft 70 so that the ejector plate 71 attached to the front end of the swing member 73 is opened as shown in phantom lines in FIG. 16, thereby dropping the workpiece W from the transfer pin 3 into a chute 76. As the slide 57 is further moved, the catcher roller 64 on the catcher arm 59 reaches the cam 66 on the slide guide 56 and rolls therealong, whereupon the catcher arm 59 is depressed against the force of the push-up spring to release the catcher 58 from the dog 13. As the catcher 58 is released from the dog 13, the slide 57, catcher arm 59 and cam follower 57 are returned to their original positions by the tension in the return spring 68. Further, the ejector plate 71, swing arm 72 and swing member 73 are also returned to their original positions by the revolving return spring 74. The cushion unit 69 absorbs the shock produced when the slide 57 is quickly returned by the return spring 68. As for the action of the ejector plate 71, its degree of opening is determined by the amount the swing arm 72 is pushed by the cam follower 75. That is, the degree of opening of the ejector plate 71 is determined by the amount of slide N the catcher roller 64 is moved to reach the cam 66. If the distance between the transfer pin 3 and the dog 13 is expressed by L, since it follows that the workpiece being conveyed by the transferpin 3 passes through the position of the ejector 71 when the latter is opened, the ejector plate 71 causes the workpieces to fall down into the chute 76. By this method, workpieces being tranferred can be removed from the pin type transfer apparatus and discharged into outside the machine. Further, when workpieces which do not need to be discharged by this discharge device XXXI pass through this position, since the ejector plate 71 is closely contacted with the frame 4, they, without being discharged there, go to a predetermined discharge area where they are discharged into outside the machine by the action of another dog and catcher.

As an alternative embodiment, instead of the above-described mechanical method of detection of a dog 13 by a catcher 58, it is possible to use a contactless relay, microswitch or the like for electrical detection and to effect the opening and closing of the ejector plate 71 by an electrical or pneumatic actuator. Further, it is also possible to use a weight in place of the return spring for the slide 57 or ejector plate 71. If an actuator is used for the operation of the ejector plate 71, rectilinear motion may be used instead of rotative motion.

As has been described so far, this bypass device comprises a transfer chain which is provided with workpiece tranfer pins and detector dogs disposed at predetermined intervals and which is adapted to be circulated in an endless form inside a frame, a catcher carried on said transfer chain and adapted to engage said dog when a transfer pin holding a workpiece reaches a predetermined position, a slide retaining a catcher through a catcher arm, connected to a return spring and movable a predetermined distance in the direction of travel of the transfer chain, a cam follower and a swing arm whereby a swing member having a workpiece ejecting plate positioned parallel to the frame is orthogonally parallelly opened around the axis of a revolving shaft, and a wedge-shaped cam positioned so that when said catcher has traveled said predetermined distance, the catcher is disengaged from the dog. With this arrangement, desired workpieces can be extremely easily and securely discharged from the transfer apparatus, and there is no need to stop the movement of the pin type transfer apparatus. The discharge device itself has no power source and operates on the basis of mechanical memory and detection, so that there is no trouble in detection and control. Further, the positional relationship and the amount of movement of the components are independent of the size of workpieces, so that there is no need to make adjustments or alter the arramgement even if there is a change of workpieces.

A collecting device according to the collecting unit used in the present invention will now be described with reference to FIGS. 17 through 22.

Figure 17:
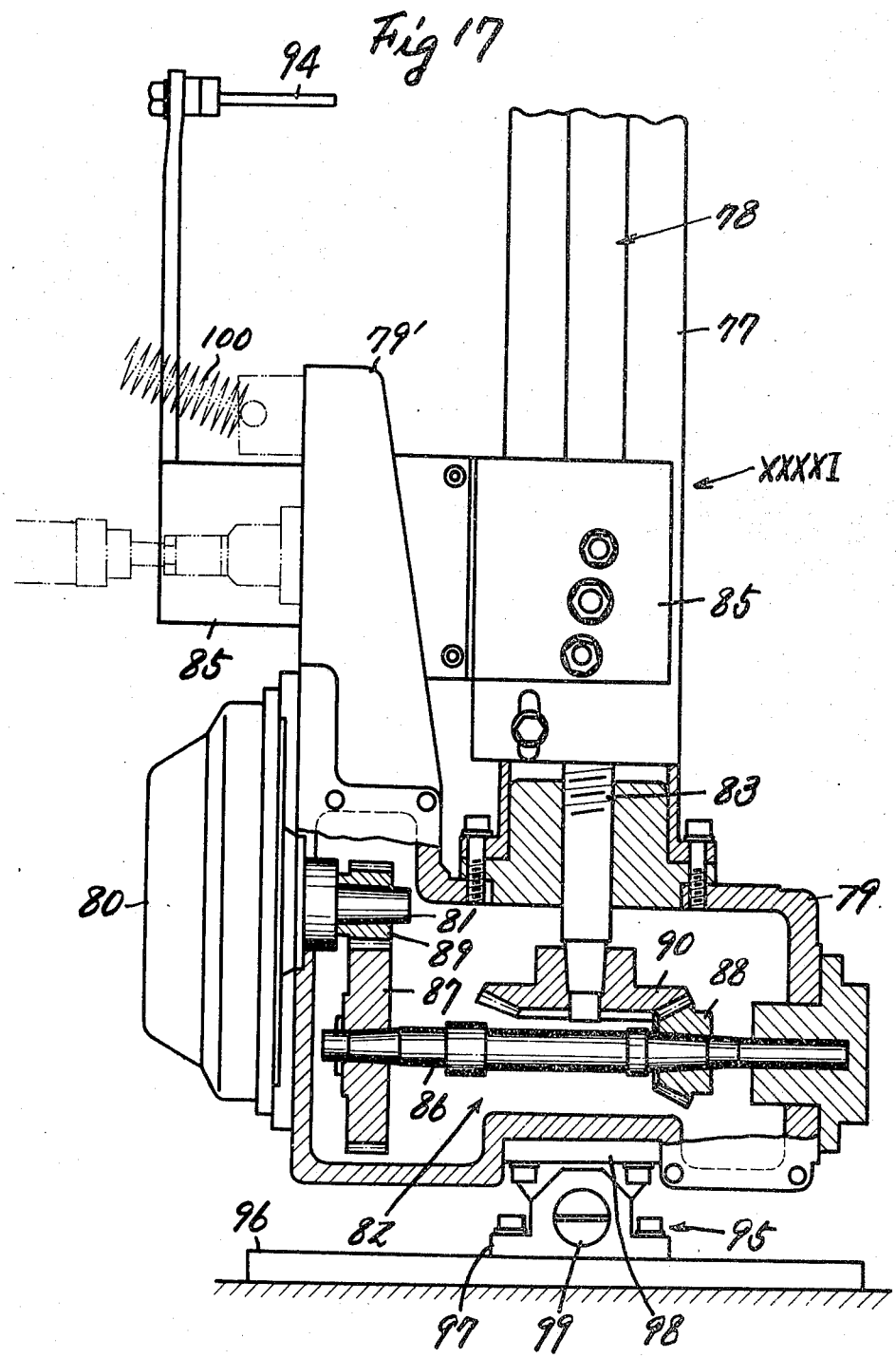
FIGS. 17 and 18 are explanatory views of a collecting device used in the present invention.
Figure 18:
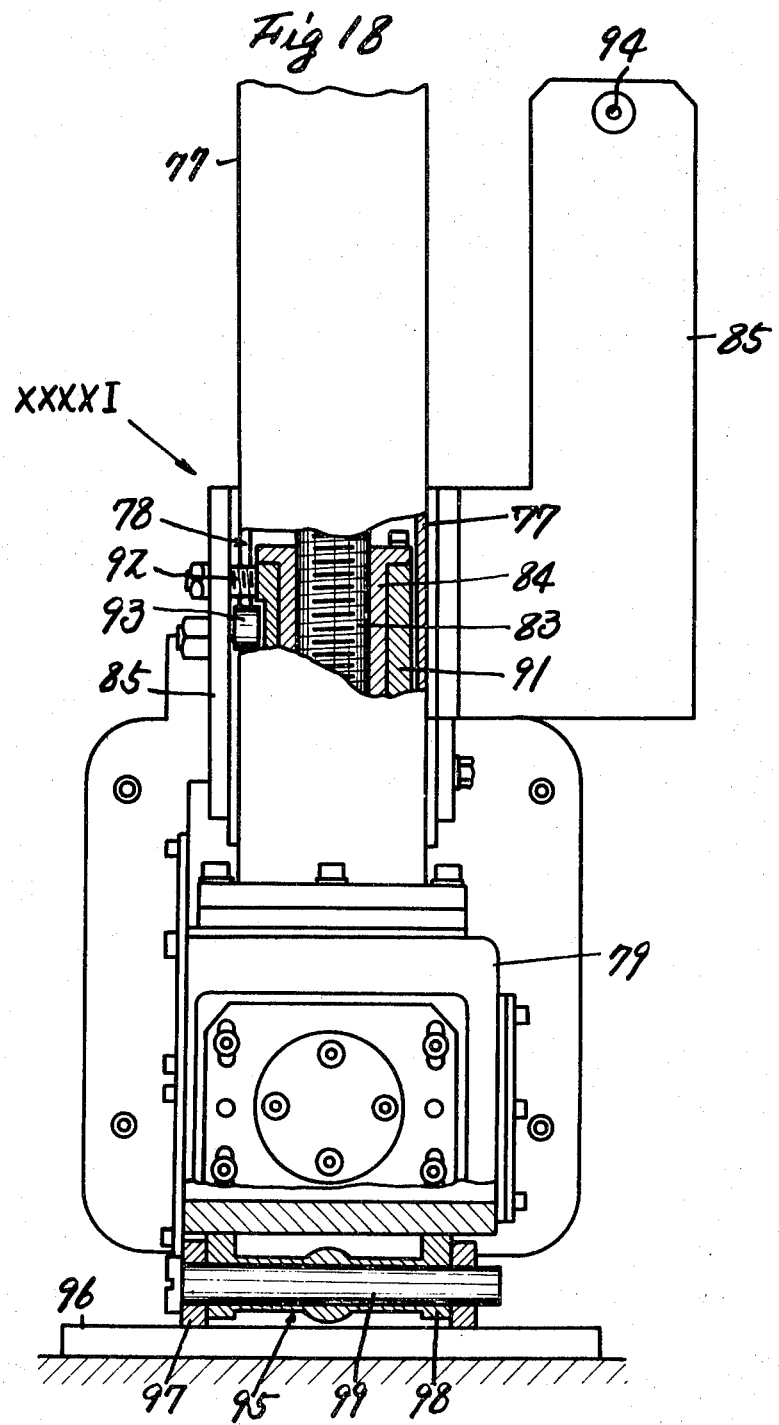
Figure 19:
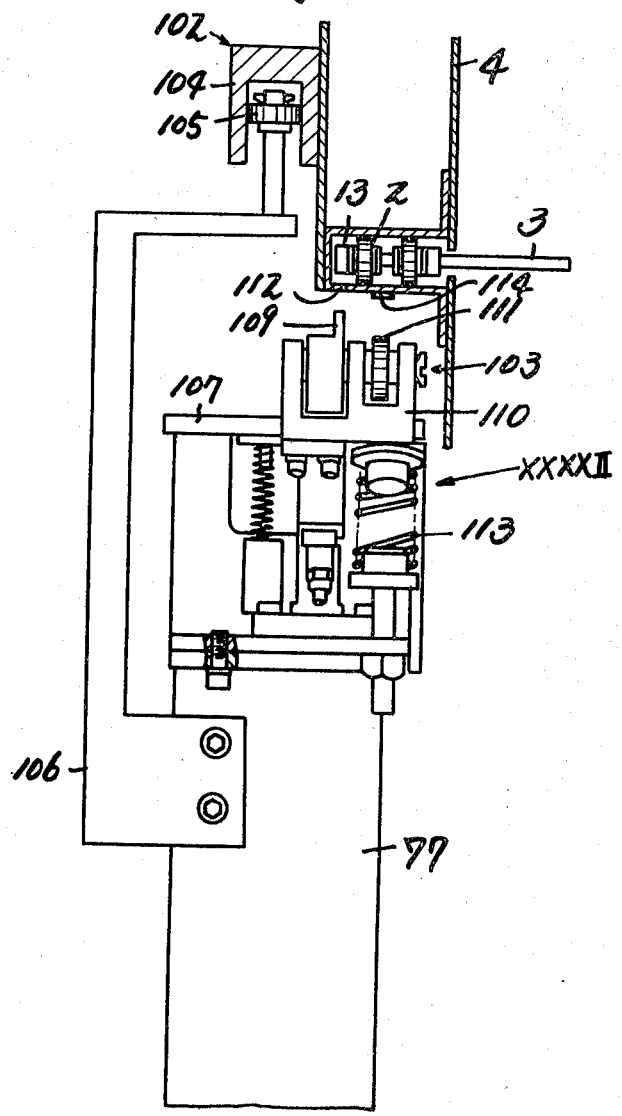
FIGS. 19 and 20 are explanatory views of an operative connection device used in the present invention.
Figure 20:
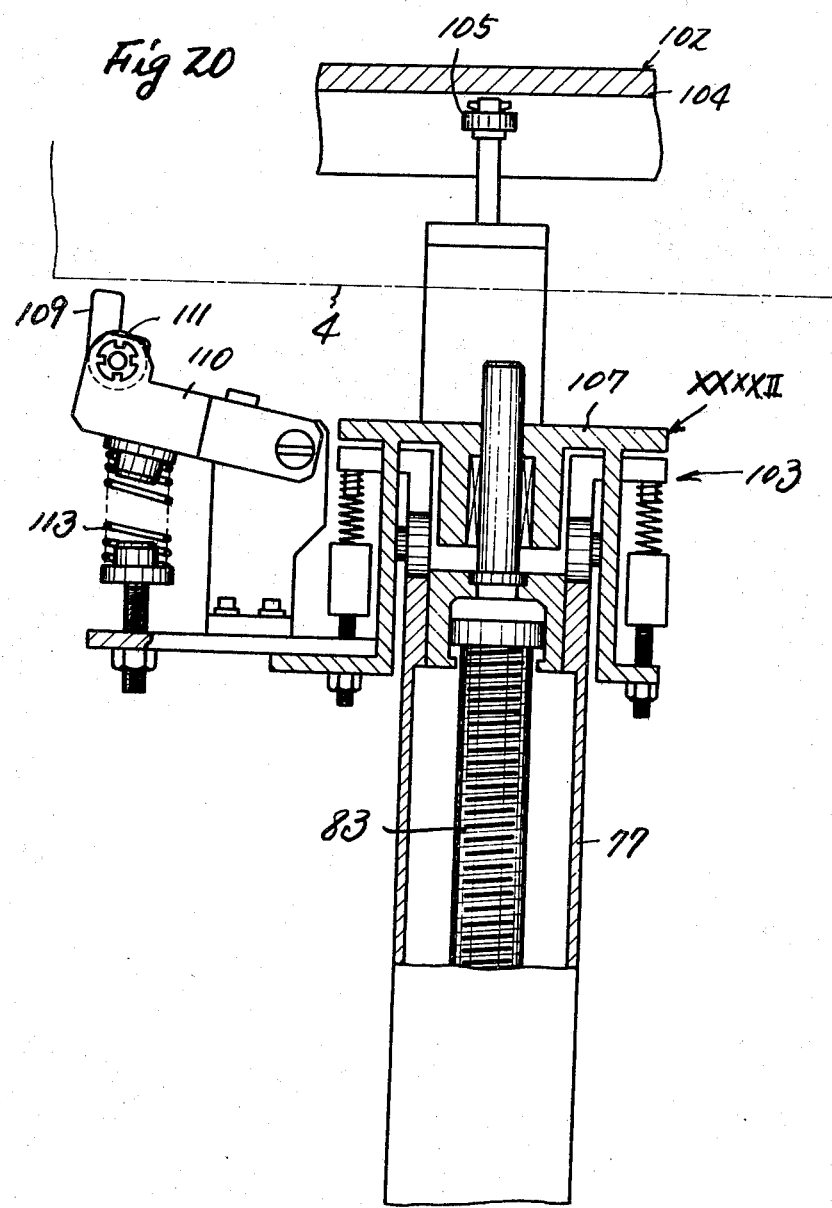

As shown in these FIGS., the collecting device comprises a vertical transfer device XXXXI for workpieces, an operative connection device XXXXII, and a workpiece delivery device XXXXIII. The vertical transfer device XXXXI, as shown in FIGS. 17 and 18, comprises a hollow cylindrical guide pipe 77 provided with a straight or curved guide groove 78 along the longitudinal axis thereof, a box 79 supporting the guide pipe 77, a motor 80 mounted on the lateral surface of said box and having a rotary shaft 81 projecting into said box, the rotation of the motor 80 being transmitted from the rotary shaft 81 through a drive mechanism 82 to a screw shaft 83 inserted in the guide pipe 77, thereby rotating the screw shaft 83, so that a transfer arm member 85 engaging the screw shaft 83 through a nut member 84 is moved up and down. The drive mechanism 82 comprises a spur gear 87 and a bevel gear 88, both being fixed on a drive shaft 86, said spur gear 87 meshing with a spur gear 89 fixed on the rotary shaft 81 of the motor 80, said bevel ger meshing with a bevel gear 90 fixed on the lower end portion of the screw shaft 83 to transmit the rotation of the motor 80 to the screw shaft 83. The nut member 84 has an outer ring 91 rotatably mounted on the outer periphery thereof, and the transfer arm member 85 is attached to said outer ring by screws 92 or the like by making use of the guide groove 78 in the guide pipe 77. A cam follower 93 disposed in said guide groove 78 is fixed to the arm member 85. Therefore, when the screw shaft 83 is rotated, the engagement between the cam follower 93 and the guide groove 78 causes the transfer arm member 85 to be moved upwardly or downwardly to control the range of movement of the transfer member 85. The transfer arm member 85 has a large width so as to be prevented from chattering, but its shape is optional. A transfer pin 94 for retaining a workpiece is firmly fixed to the front end portion of the transfer arm member 85. Provided on the lower surface of the box 79 is swing means 95 whereby the device XXXXI for upwardly transferring apertured workpieces is swung along the transfer chain. The swing means includes a shaft 99 extending centrally through a support member 97 fixed on a frame 96 which is used for installation of the transfer device XXXXI, and through an attaching member 98 fixed to the lower surface of the box 79. The movement of the transfer device in the direction of travel of the transfer chain is effected by the chain, and its movement in the opposite direction back to its original position is effected by a return spring 100 associated with a cushion device 101 and attached to a projection 79' formed on one side of the upper surface of the box 79. The device XXXXII for operatively connecting the transfer device to the chain comprises a guide portion 102 and a coupling portion 103, as shown in FIGS. 19 and 20. The guide portion 102 comprises a guide roller 105 inserted in a guide frame 104 with its lower end opened fixed to the lateral surface of the frame 4 where the transfer pins do not project, said guide roller 105 being mounted on a support frame 106 fixed to the upper lateral surface of the guide pipe 77. Thus, the guide roller 105 is slid inside the guide frame 104 to facilitate the swing motion of the guide pipe 77.

The coupling portion 103 comprises a guide member 107 disposed on the upper end of the guide pipe 77 so as to be vertically movable, and a catcher arm 110 swingably attached to said slide member 107 and having a catcher 109 rotatably attached to the front end thereof. A catcher roller 111 is rotatably attached to the intermediate region of the catcher arm 110.

Figure 21:
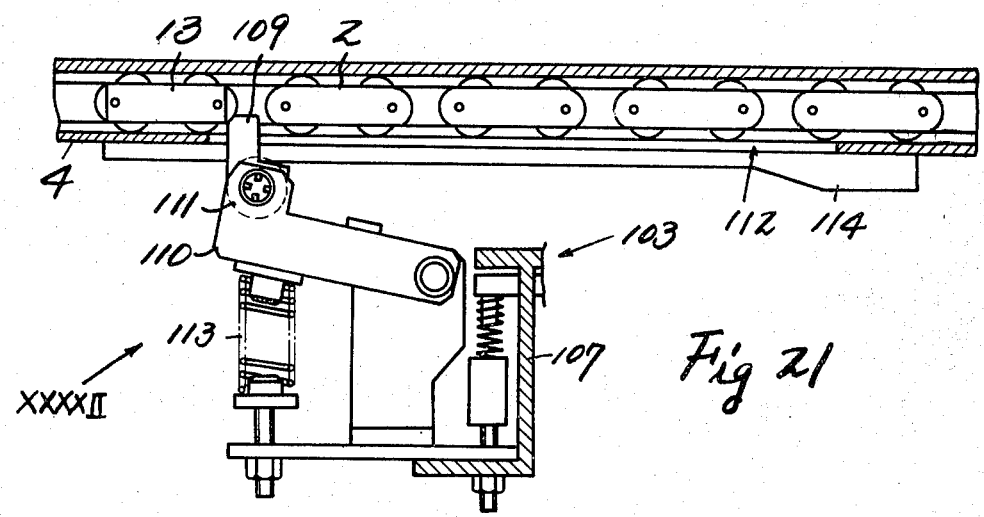
FIGS. 21 and 22 are explanatory views used in the present invention.
Figure 22:
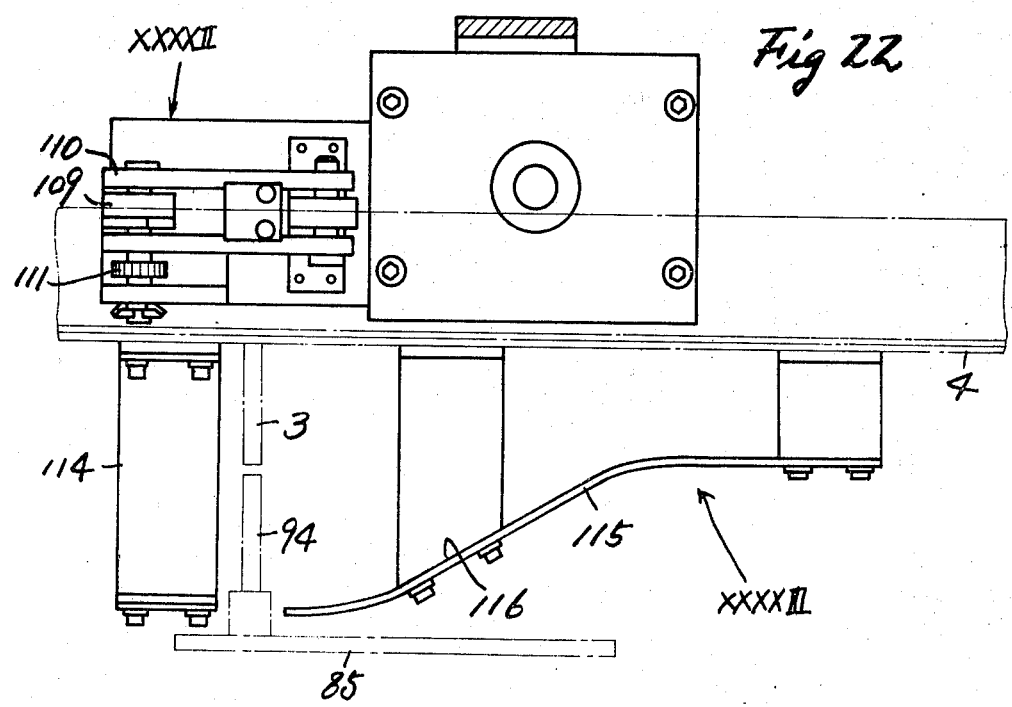

With the above described arrangement, as the nut member 84 moves upwardly in the guide 77, the slide member 85 is lifted by the slide member 107 through a predetermined distance, so that the catcher 109 attached to the slide member 107 through the catcher arm 110 enters the frame 4 through an elongated opening 112 formed in the lower surface thereof and projects into the path of travel of the detector dog 13 attached to the transfer chain 2. The dog 13 attached to the transfer chain 2 engages the catcher 109, and thereafter the guide pipe 77 is tilted by the transfer chain 2 in the direction of travel of the transfer chain 2. The catcher roller 111 on the catcher arm 110 has abutted against the lower surface of the frame 4. In addition, the catcher arm 110 is forced constantly upwardly by a spring 113. When the catcher 109 abutting against the dog 13 is moved through a predetermined distance, the catcher roller 111 runs on a cam 114 having a slope and attached to the lower surface of the frame 4, as shown in FIG. 21, with the result that the catcher arm 110 is depressed against the force of the spring 113 to release the catcher 109 from the dog 13. The workpiece delivery device XXXXIII, as shown in FIG. 22, comprises a workpiece vibration-preventive plate 114 and a workpiece guide plate 115, which are mounted on the lateral surface of the frame 4 for the horizontal transfer device XI where the transfer pins 3 project, so as to be located below the level of the transfer pins 3 and opposed to the above described operative connection device XXXXII. The guide plate 115 has a taper 116 extending from the rear end to the middle, coming closer to the lateral side of the frame 4 as it is traced from the rear end to the front end. Between the front end portion of the guide plate 115 and the lateral side of the frame 4, there is a width sufficient for workpieces W to pass without hindrance. The rear end of the guide plate 115 is located approximately at the position where the transfer pin 94 is attached. When the vertical transfer pin 94 retaining a workpiece W is moved in the direction of travel of the transfer chain 2 while it is in opposed relationship with the horizontal transfer pin 3, the workpiece W is gradually pushed toward the frame 4 along the taper 116 until it is delivered from the vertical transfer pin 94 onto the horizontal transfer pin 3.

The function of the collecting device will now be described.

When a workpiece is placed on the vertical transfer pin 94 of the transfer device XXXXI by any suitable method, the motor 80 is started manually or automatically, so that the rotary shaft 81 is rotated, whereupon the spur gear 87 meshing with the spur gear 89 fixed on the rotary shaft 81 is rotated to rotate the drive mechanism 86. The bevel gear 90 provided in the drive mechanism 86 is rotated and hence the screw shaft 83 is rotated. As the screw shaft 83 is rotated, the nut member 84 engaged with the screw shaft 83 tends to be rotated, but the presence of the cam follower 93 in the guide pipe 77 prevents the rotation of the nut member, so that the latter is caused to move upwardly along the screw shaft 83. As the cam follower 93 is upwardly moved sliding in the guide groove 78, the transfer pin 94 attached to the front end of the transfer arm member 85 reaches a position where it is horizontally aligned with the transfer pin 3 and these two pins are opposed to each other. When the arm member 85 is just about to reach the upper end of its stroke, it pushes up the slide member 107 of the operative connection device XXXXII, whereupon the upper end of the catcher 109 attached to the slide member 107 through the catcher arm 110 projects into the frame 4 of the horizontal transfer device XI through the elongated opening 112 formed in the lower surface of the frame 4 until it enters the path of travel of the transfer chain 2 to provide for the detection of a predetermined detection dog 13. Such detection dogs 3 are attached to the transfer chain 2 so as to be associated with the detection dogs 13, and when such dog 13 abuts against the catcher 109, the horizontal transfer pin 3 reaches a position where it is aligned with the transfer pin 94. When the dogs 13 abuts against the catcher 109, the latter is retained by the dog 13 and thereby pushed in the direction of travel of the transfer chain 2. As the catcher 109 is moved, the transfer device XXXXI is swung around the axis of the swing means 95 at the lower end thereof in the direction of travel of the transfer chain 2, causing the guide roller 105 to run in the guide frame 104. At this time, the vertical transfer pin 94 and the horizontal transfer pin 3 are moved at the same speed in the same direction in opposed relationship with each other, and the workpiece W retained by the vertical transfer pin 94 comes in contact with the taper 116 of the guide plate 115 during movement and is gradually urged toward the frame 4 until it is delivered onto the horizontal transfer pin 3 and thereby transferred. Although the vertical transfer pin 94 moves in an arcuate path while the horizontal transfer pin 3 moves in a straight path, there will be no trouble to the delivery of workpieces so long as the greatest amount of shift between the two paths is smaller than the aperture size of workpieces. Upon completion of delivery of the workpiece, the catcher roller 111 attached to the catcher arm 110 is depressed by the cam 114 provided on the lower surface of the frame 4 and the catcher arm 110 is downwardly moved against the force of the spring 113, so that the catcher 109 attached to the front end of the catcher arm 110 is also lowered and released from the dog 13. When the catcher 109 is released from the dog 13, the transfer device XXXXI which has swung is returned to its original position by the return spring 100. The inertia of the transfer device XXXXI in returning movement is absorbed by the cushion device 101 to allow the transfer device XXXXI to stop quietly. When the transfer device XXXXI returns to its original position, this is detected by the electric detector or the like (not shown), the latter then producing a signal to reverse the direction of rotation of the motor 80 so as to lower the tranfer arm member 85. When the transfer arm member 85 is lowered, the motor 80 is stopped by the position detector (not shown) and all is ready for the next transfer.

In addition, the drive source to be used in this collecting device may be an electric motor or a fluid motor. Further, the drive mechanism 82 is not limited to the one using gears and it may be of the direct connection type using belts or couplings.

As has been described so far, according to this collecting device, a workpiece to be transferred is retained by the tranfer pin of the vertical transfer device and thereby upwardly transferred and the catcher of the operative connection device attached to upper end of the transfer device is caused to abut against the dog of the pin type transfer device. The vertical transfer pin and the horizontal transfer pin are opposed to each other and in this condition they are moved at the same speed in the same direction through a predetermined distance along the frame, during which movement the guide plate attached to the frame causes the workpiece to move from the horizontal transfer pin onto the vertical transfer pin. After the workpiece has been fully moved, the catcher is released from the dog and the operative connection device and vertical transfer device are returned to their original positions to be ready for the next transfer operation. Further, it is so arranged that the catcher will not abut against the detection dogs associated with the horizontal transfer pins which are now transferring workpieces. Thus, without stopping the horizontal transfer device, workpieces can be placed in the transfer line and they can be efficiently transferred. Moreover, all but the vertical movement control are mechanically operatively connected together and since there is no need to use a complicated control mechanism, there is little trouble in connection with control. Further, since the transfer is simply by catching a workpiece by a transfer pin, there is no need to alter the arrangement of the apparatus when the size of workpieces is changed. Also, as the direction in which the transfer pin of the vertical transfer device extends at the lower end can be freely changed by changing the shape of the guide groove formed in the guide pipe, the direction in which workpieces are taken in onto the vertical transfer pin is optional.

What is claimed is:

1. A pin type transfer apparatus for apertured workpieces comprising frame means, slot means vertically disposed in said frame means, endless chain means operatively positioned for movement around said frame means in a vertical plane and in vertical alignment with said slot means of said frame means, a plurality of pin means attached at one end to one lateral surface of said chain means at spaced points therealong, and projecting outwardly therefrom and extending through the slot means of said frame means for vertical movement therein, horizontally disposed hand-over dish means operatively associated with said frame means, said dish means having horizontally disposed slot means positioned centrally thereon from one edge thereof and in registry with the vertically disposed slot means of said frame means to permit the pin means to move therethrough, said hand-over dish means including means for moving said dish means back and forth, means to push a workpiece laterally from a loading position onto said hand-over dish means and in registry with the horizontally disposed slot positioned therein, adjusting means positioned rearwardly of said hand-over dish means for positioning a workpiece thereon in a normal position and insertion means mounted on said frame means and positioned above said hand-over dish means, said frame means straddling said chain means and said pin means thereby permitting a workpiece positioned on the hand-over dish means to be firmly caught by the transfer pin means and thereafter transferred upwardly to a predetermined place.

2. A pin type transfer apparatus for apertured workpieces comprising frame means, a plurality of sprocket means positioned at spaced intervals along the frame means, power means operatively associated with said sprocket means for rotating same, endless chain means mounted on said sprocket means for endless movement around said frame means upon rotation of said driven sprocket means, a plurality of pin means attached at one end to one lateral surface of said chain means at spaced points therealong and projecting outwardly therefrom in a horizontal plane, inlet feed means operatively associated with said chain means for feeding apertured workpieces for reception by said pin means, outlet feed means operatively associated with said chain means for receiving apertured workpieces discharged from said pin means and by-pass means for removing workpieces from said pin means at selected point, said by-pass means including position detecting dog means attached to said chain means in axially variable relationship thereto at spaced intervals therealong and each being in operative association with a corresponding pin means, catcher means operatively associated and engageable with said dog means, means for moving said catcher means into the path of travel of said chain means to engage said dog means and to move the catcher means for a predetermined distance axially with said chain means while in engagement with said dog means, ejector means mounted on said frame means and actuatable by said catcher means to engage and remove a workpiece carried on said pin means, and cam means engageable with said catcher means after its movement for a predetermined distance to disengage same from said dog means.

3. A pin type transfer apparatus for apertured workpieces comprising frame means, a plurality of sprocket means positioned at spaced intervals along the frame means, power means operatively associated with said sprocket means for rotating same, endless chain means mounted on said sprocket means for endless movement around said frame means upon rotation of said driven sprocket means, a plurality of horizontal pin means attached at one end to one lateral surface of said chain means at spaced points therealong and projecting outwardly therefrom in a horizontal plane, a plurality of dog means mounted on said chain means and in operative relationship with said pin means, inlet feed means operatively associated with said chain means for feeding apertured workpieces for reception by said pin means, outlet feed means operatively associated with said chain means for receiving apertured workpieces discharged from said pin means, and collection means for transferring a workpiece from a second pin means to said horizontal pin means, said collection means comprising transfer arm means, second pin means secured at one end to one end of said arm means for carrying a workpiece thereon, means to move said transfer arm means up or down in the direction of travel of the endless chain means, catcher means mounted for operable engagement with said dog means, means for moving said catcher means into the path of travel of said dog means to engage same and to move the catcher means for a distance sufficient to bring said second pin means into registry with a horizontally disposed pin means, to permit a workpiece positioned on said second pin means to be transferred to the horizontally disposed pin means, and means to disengage said catcher means from said dog means after the workpiece has been transferred.

* * * * *